United States Patent [19]

London et al.

[11] 4,148,311
[45] Apr. 10, 1979

[54] GAS MIXING APPARATUS

[75] Inventors: Richard C. London, Charlbury; Alexander J. F. MacMillan, Church Crookham, both of England; Henry L. Roxburgh, Alderney, Channel Islands

[73] Assignee: The Secretary of State for Defence in Her Britannic Majesty's Government of the United Kingdom of Great Britain and Northern Ireland, London, England

[21] Appl. No.: 798,253

[22] Filed: May 18, 1977

[30] Foreign Application Priority Data

May 6, 1975 [GB] United Kingdom ............... 19036/75
May 24, 1976 [GB] United Kingdom ............... 21497/76

[51] Int. Cl.² .......................................... B63C 11/16
[52] U.S. Cl. ................................ 128/142.2; 128/210; 137/81; 137/100; 137/111
[58] Field of Search ............ 128/142.2, 142 R, 142.3, 128/142.7, 209, 210, 145.8; 137/81, 100, 111, DIG. 9

[56] References Cited

U.S. PATENT DOCUMENTS

| 2,145,114 | 1/1939 | Gibbs et al. | 137/100 X |
| 2,192,662 | 3/1940 | Jones | 137/100 |
| 2,583,502 | 1/1952 | Wiggins | 137/81 |
| 3,068,879 | 12/1962 | Snowman et al. | 137/81 |

FOREIGN PATENT DOCUMENTS

| 629159 | 9/1949 | United Kingdom. |
| 857927 | 1/1961 | United Kingdom. |
| 895373 | 5/1962 | United Kingdom. |
| 1104640 | 2/1968 | United Kingdom. |

Primary Examiner—Henry J. Recla
Attorney, Agent, or Firm—Cushman, Darby & Cushman

[57] ABSTRACT

Apparatus for supplying a mixture of oxygen and air for respiratory purposes and comprising a supply regulator having a first chamber with an inlet and an outlet for oxygen and a second chamber with an inlet and an outlet for air, control means responsive to a higher pressure in said first than said second chambers to permit air to enter said second chamber, adjustment means for modifying the action of said control means, first and second restrictors in the first and second outlets respectively, the second restrictor bore being larger than that of the first, said first and second outlets leading to a common supply duct and then to a first demand regulator responsive to an inspiration pressure drop to permit a flow of gas therethrough.

38 Claims, 1 Drawing Figure

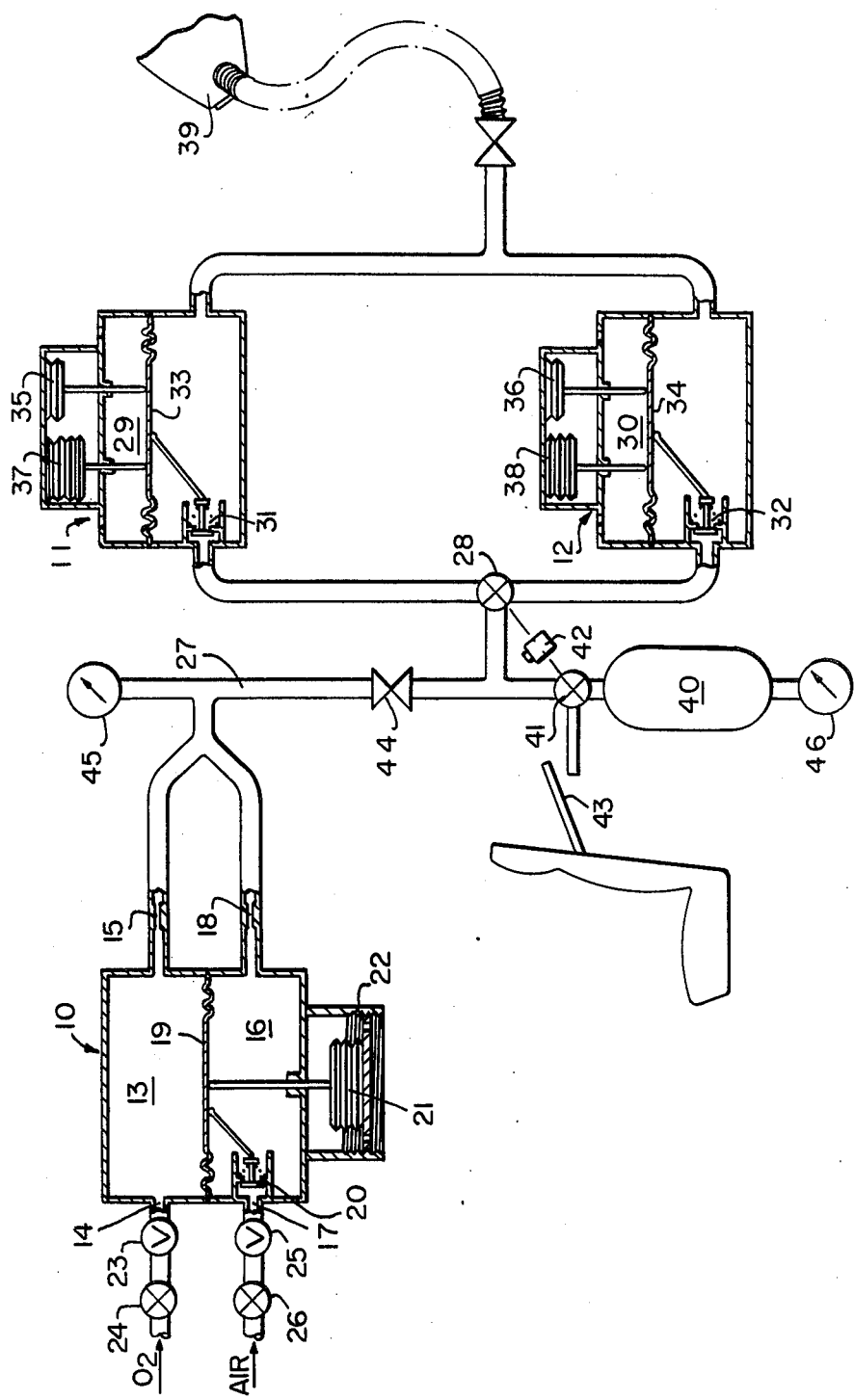

GAS MIXING APPARATUS

The present invention relates to apparatus for supplying a mixture of gases at pressure. It is particularly concerned with respiration systems for supplying oxygen and air to airborne personnel, especially aircrew.

A typical aircraft capable of flying at high altitude, e.g. over 30,000 ft, has respiration apparatus for supplying breathing gas directly to each aircrewman. In the usual system air is drawn from the cabin, which is supplied from the environment. The pressure in the cabin is arranged to decrease with altitude at a rate such that at about 20,000 m real altitude the equivalent cabin altitude is 7,000 m. It is therefore necessary to supplement the air with oxygen to an increasing extent with altitude, because of the variation with altitude of the partial pressures of the constituent gases in air. In most such respiration systems hitherto, oxygen stored in the aircraft is passed through a venturi, and the air is thereby drawn into the mixture. These systems are incapable of supplying less than a certain proportion of oxygen, which proportion is considerably more than that required at lower altitudes. As a consequence not only has more oxygen than has actually been required had to be stored, but that kind of quantity has had to be stored in liquid or highly pressurised state, and the resultant weight penalty has been aggravated by location and/or insulation problems.

The present invention provides a simple apparatus wherein the oxygen partial pressure in the supply mixture can be varied in accordance with altitude.

According to the present invention apparatus for supplying a mixture of two gases at pressure comprises a supply regulator having a first chamber with an inlet and an outlet for the first gas and a second chamber with an inlet and an outlet for the second gas, control means responsive to a higher pressure in the first chamber than in the second to permit the second gas to enter the second chamber, adjustment means for modifying the action of the control means, a first restrictor in the first outlet and the second restrictor in the second outlet, the second restrictor bore being larger than that of the first, a junction between the first and second outlets and a common supply duct down-stream of the restrictors, and a first demand regulator permitting on demand flow of gas in the common supply.

In use of apparatus in accordance with the invention, while there is no demand for gas mixture on the demand regulator this latter prevents the passage therethrough of the gases, and the pressure of the gas in the first chamber is equalised with that in the second by virtue of the junction between the two outlets. When there is a demand on the demand regulator this latter permits gas to flow therethrough. Because the difference in the restrictor sizes permits flow more readily from the second chamber than the first, a pressure difference is set up between the two which causes permission of the second gas into the second chamber and thence into the common supply. Insofar as a change is required in the proportion of the first gas in the mixture, the adjustment means can be used to alter the pressure difference between the chambers at which the second gas will be allowed to flow.

The adjustment means may include environmental pressure sensing means whereby the proportion of the first gas in the mixture may be varied in accordance with changes in environmental pressure, be that for example water pressure in the case of oxygen/air supply apparatus used in diving equipment, or air pressure in the case of oxygen/air supply apparatus used by airborne personnel.

According to a feature of the invention the control means responsive to a higher pressure in the first chamber than in the second to permit the second gas to enter the second chamber may comprise a diaphragm separating the first chamber from the second and a valve in the second chamber inlet operable by the diaphragm. The adjustment means may be arranged to operate on the diaphragm.

The environmental pressure sensing means may comprise an aneroid capsule, and may be additionally adjustable.

In an important embodiment of the invention the apparatus is part of equipment for supplying respiratory gas to a person, and the first gas supply is oxygen stored at above normal atmospheric pressure and the second gas supply is air at above atmospheric pressure, perhaps supplied from the environment via a pump and a filter. The outlet from the demand regulator is connected directly to a respirator mask, such as an oro-nasal mask, so that the demand regulator is arranged to permit the passage of common supply gas on sensing the reduction of pressure in the common supply downstream thereof brought about by the user commencing inspiration.

In the case of oxygen/air apparatus an aneroid capsule is preferably arranged to increase the proportion of oxygen with altitude.

Oxygen/air apparatus according to the invention and for aircrew also has advantageously the usual emergency facilities including an emergency oxygen supply, preferably connected into the apparatus downstream of the supply regulator, an emergency demand regulator by-passing the normal demand regulator, and a pressure breathing facility catering for accidental loss of environmental pressure.

The demand regulators, both normal and emergency, may be of a construction similar to that of a supply regulator, a first chamber of each being open to environmental pressure whereby a demand will open the second chamber inlet. The demand may be constituted by a pressure reduction normally generated by inhalation. The operation of the demand regulators may be modified by means, perhaps including at least one aneroid, to supply emergency oxygen at pressure in the event of sudden loss of environmental pressure and to supply the normal gas mixture at a pressure slightly above that of the environment to cater for leaks at the apparatus/user interface.

In the case of an airborne system, while the normal and emergency oxygen may be stored in reservoirs, the air may be derived from the engine compressors. This air supply may also be fed to the first chamber of the normal and emergency demand regulators.

Oxygen/air apparatus in accordance with the invention and for use by aircrew will now be described by way of example with reference to the accompanying schematic diagram of the apparatus.

As shown in the diagram the apparatus includes a supply regulator 10, and normal and emergency demand regulators 11 and 12. The supply regulator 10 has a first gas chamber 13 with a first gas inlet 14 and a first gas outlet containing a restrictor 15, and a second gas chamber 16 with a second gas inlet 17 and a second gas outlet containing a restrictor 18. The restrictor 18 has a larger bore than the restrictor 15. A diaphragm 19 separates the two chambers and is in operative relationship with a toggle valve 20 controlling the second gas inlet 17. An aneroid capsule 21 modifies the action of the diaphragm 19 and adjustment means 22 are provided for varying the datum position of the aneroid capsule 21.

Upstream of the first inlet 14 is a reducing valve 23 and a cock 24, and upstream of the second inlet 17 is a reducing valve 25 and a cock 26.

Downstream of the restrictors 15 and 18 the outlets are joined into a common duct 27 which, via a cock 28, forms the inlet to the normal and emergency demand regulators 11 and 12. The regulators 11 and 12 are similar in construction to the supply regulator 10, which is a conventional construction, but the first chambers 29 and 30 thereof are open to the cabin pressure. The inlets to the gas regulators 11 and 12 are controlled by toggle valves 31, 32 in operative relationship with diaphragms 33, 34. The action of the diaphragms 33, 34 is modified by safety pressure aneroid capsules, 35, 36 and pressure breathing aneroid capsules 37, 38. The outlets to the regulators 11 and 12 pass to a mask 39.

Connected into the duct 27 is the emergency oxygen facility comprising an emergency reservoir 40, a cock 41, a manual control 42, an ejection trip 43, and a disconnect 44. The demand regulators and the emergency oxygen system are mounted on the aircrewman's ejector seat, and the supply regulator 10 on the aircraft as close as possible to it to minimize the length of the ducting 27 between the supply regulator 10 and the emergency oxygen reservoir 40 on the one hand and the demand regulators 11 and 12 on the other. Normal and emergency pressure gauges 45 and 46 indicate the pressures in the duct 27 and the reservoir 40 respectively. The emergency oxygen is delivered at a pressure somewhat less than the normal oxygen.

In normal use of the system, the valves 24 and 26 are open, the valve 28 connects the duct 27 with the normal regulator 11, and pressurized oxygen enters the first chamber 13 at inlet 14 via the cock 24 and the valve 23. Pressurized air is supplied to the second inlet 17 via the cock 26 and the valve 25. While there is no pressure reduction on the duct 27 the pressure in the chambers 13 and 16 is equalized by flow back of oxygen through the restrictor 18. The valve 20 thus remains closed and no air is allowed into the second chamber.

When there is a pressure reduction in the duct 27, by virtue of the different bores of the restrictors 15 and 18 a pressure difference is set up between the chambers 13 and 16, the diaphragm 19 is depressed and the valve 20 opened to allow air through the second chamber to mix with the oxgyen in the duct 27.

Pressure reduction in the duct 27 is brought about by inhalation by the wearer of the mask 39, which causes deflection of the diaphragm 33 of the normal demand regulator 11, and opening of the valve 31. The normal drop in cabin pressure with increase in aircraft altitude has two main effects. It will expand the aneroid capsule 21 in the supply regulator 10, raise the diaphragm 19 and increase the proportion of oxygen in the mixture. It will also expand the safety pressure aneroid capsules 35 and 36 to ensure that the gas supplied to the mask 39 is at a pressure slightly above cabin pressure so that there is enough leak of gas from the mask rather than into it.

The apparatus caters for various emergencies. In the event of failure or contamination of the bleed air the user may switch to 100% normal oxygen using the cock 26. If the normal supply as a whole appears to fail the user will normally suspect a failure of the normal demand regulator 11 first, and will switch to the emergency demand regulator 12 using the cock 28. He may, to ensure immediate oxygen supply however operate this using the button 42 which is linked to both the cocks 28 and 41. By virtue of the lower pressure of the emergency oxygen supply this will not be used unless no oxygen is available from the normal supply. The wearer will know that the emergency supply is not being used by reading the gauge 46. If there is an accidental loss of cabin pressure the demand regulators 11 and 12 will switch to a pressure breathing mode by virtue of the operation of the aneroid capsules 37 and 38. In the event of ejection, the passage of the seat operates the trip 43, opening the cock 41 and switching the cock 28 to connect the duct 27 to the emergency demand regulator 12, and disconnects the socket 44 which closes the duct 27 at that point.

Typically the aircraft system has a normal oxygen supply pressure of 40 lb/sq in and an emergency oxygen supply pressure of 20 lb/sq in, and the air supply from the engine compressors is at about 50 lb/sq in. In such a system the restrictors 15 and 18 have bores of 0.0935 in and 0.0960 in respectively. Cabin pressure drops to about 7,000 m altitude when the aircraft reaches its ceiling which may be about 20,000 m The aneroid capsule 21 permits account to be taken of this in the supply to the user. The aneroid capsules 37 and 38 may be arranged to switch over when the environmental pressure drops below that at 10,000 m.

I claim:

1. Apparatus for supplying a mixture of two gases at pressure and comprising a supply regulator having a first chamber with an inlet and an outlet for the first gas and a second chamber with an inlet and an outlet for the second gas, control means responsive to a higher pressure in said first chamber than in said second chamber to permit the second gas to enter said second chamber, adjustment means for modifying the action of said control means in accordance with variations of environmental pressure, a first restrictor in said first outlet and a second restrictor in said second outlet, said second restrictor bore being larger than said first restrictor bore, a junction connected between said first and second outlets downstream of said restrictors, a common supply duct connected to said junction, and a first demand regulator in said common supply duct permitting on demand flow of gas therethrough.

2. Apparatus as claimed in claim 1 and wherein said adjustment means comprises environmental pressure sensing means whereby the proportion of the first gas in the mixture may be varied in accordance with changes in environmental pressure.

3. Apparatus as claimed in claim 2 and wherein said pressure sensing means comprises an aneroid capsule.

4. Apparatus as claimed in claim 1 and wherein said means in the supply regulator responsive to a higher pressure in the first chamber than in the second comprises a diaphragm separating said first chamber from said second chamber and a valve in said second chamber inlet operable by said diaphragm.

5. Apparatus as claimed in claim 4 and wherein said valve is a toggle valve.

6. Apparatus as claimed in claim 1 and having an emergency demand regulator by-passing said first demand regulator.

7. Apparatus as claimed in claim 6 and wherein said emergency demand regulator comprises a first chamber open to environmental pressure, a second chamber having an inlet and an outlet connected in said common supply duct, and control means responsive to a higher pressure in said first chamber than in said second chamber to permit gas in said common supply to enter said second chamber.

8. Apparatus as claimed in claim 7 and wherein said control means of said emergency demand regulator comprises a diaphragm dividing said first from said second chamber and a valve operated thereby and operable on said second chamber inlet.

9. Apparatus as claimed in claim 8 and wherein said valve is a toggle valve.

10. Apparatus as claimed in claim 5 and having normal environmental pressure adjustment means operable to modify the operation of said first and said emergency demand regulators in accordance with normal variation of environmental pressure.

11. Apparatus as claimed in claim 10 and wherein said adjustment means comprises at least one aneroid capsule.

12. Apparatus as claimed in claim 5 and having a demand regulator by-pass cock operable to divert the common supply from said first to said emergency demand regulators.

13. Apparatus as claimed in claim 6 and adapted to form part of equipment for supplying respiratory gas to a person, said first chamber inlet being adapted for connection to a supply of oxygen at a pressure above normal atmospheric pressure, said second chamber inlet being adapted for connection to a supply of air at a pressure above normal atmospheric pressure, said common supply duct downstream of said first and mergance demand regulators being adapted for connection to a respirator, and said demand regulators being arranged to permit the passage of gas in said common supply duct on sensing a reduction in pressure downstream thereof brought about by a user commencing inhalation.

14. Apparatus as claimed in claim 13 and wherein said first and emergency demand regulators have pressure breathing means operable to sense an emergency change of environmental pressure and accordingly override both said first and said emergency demand regulators.

15. Apparatus as claimed in claim 14 and wherein said pressure breathing means comprise at least one aneroid capsule.

16. Apparatus as claimed in claim 13 and having a demand regulator by-pass cock operable to divert the common supply from said first demand regulator to said emergency demand regulator and an emergency oxygen supply connected into said common supply duct upstream of said by-pass cock.

17. Apparatus as claimed in claim 16 and wherein said emergency oxygen supply is at a lower pressure than the oxygen supply to said first chamber inlet.

18. Apparatus as claimed in claim 16 and forming part of aircrew respiration equipment and having an emergency oxygen supply cock adapted for operation by an ejector seat mechanism.

19. Apparatus as claimed in claim 13 and wherein said emergency demand regulator is arranged to require a slightly larger pressure difference for operation than said first demand regulator.

20. Apparatus as claimed in claim 6 and wherein said emergency demand regulator is arranged to require a slightly larger pressure difference for operation than said first demand regulator.

21. Apparatus as claimed in claim 1 and wherein said first demand regulator comprises a first chamber open to environmental pressure, a second chamber having an inlet and an outlet connected in said common supply duct, and control means responsive to a higher pressure in said first chamber than in said second chamber to permit gas in said common supply to enter said second chamber.

22. Apparatus as claimed in claim 21 and wherein said demand regulator control means comprises a diaphragm dividing said first from said second chamber and a valve operated thereby and operable on said second chamber inlet.

23. Apparatus as claimed in claim 22 and wherein said valve is a toggle valve.

24. Apparatus as claimed in claim 1 and having a normal environmental pressure adjuster operable to modify the operation of said first demand regulator in accordance with normal variation of environmental pressure.

25. Apparatus as claimed in claim 13 and wherein said adjuster comprises an aneroid capsule.

26. Apparatus as claimed in claim 1 and adapted to form part of equipment for supplying respiratory gas to a person, said first chamber inlet being adapted for connection to a supply of oxygen at a pressure above normal atmospheric pressure, said second chamber inlet being adapted for connection to a supply of air at a pressure above normal atmospheric pressure, said common supply duct downstream of said first demand regulator being adapted for connection to a respirator, and said first demand regulator being arranged to permit the passage of gas in said common supply duct on sensing a reduction in pressure downstream thereof brought about by a user commencing inhalation.

27. Apparatus as claimed in claim 26 and wherein said first demand regulator has pressure breathing means operable to sense an emergency change of environmental pressure and accordingly to pass respiratory gas to a user.

28. Apparatus as claimed in claim 27 and wherein said pressure breathing means are operable to override said first demand regulator.

29. Apparatus as claimed in claim 28 and wherein said pressure breathing means comprise an aneroid capsule.

30. Apparatus as claimed in claim 27 and wherein said pressure breathing means comprise an aneroid capsule.

31. Apparatus as claimed in claim 26 and having an emergency oxygen supply connected into said common supply duct.

32. Apparatus as claimed in claim 31 and wherein said emergency oxygen supply is connected into said common supply duct upstream of said first demand regulator.

33. Apparatus as claimed in claim 31 and wherein said emergency oxygen is arranged to be supplied at a lower pressure than the oxygen supply to said first chamber inlet.

34. Apparatus as claimed in claim 31 and forming part of aircrew respiration equipment and having an emergency oxygen supply cock adapted for operation by an ejector seat mechanism.

35. Apparatus for supplying respiratory air and oxygen to a person and comprising:
   a supply regulator having a first chamber with an inlet and an outlet for oxygen and a second chamber with an inlet and an outlet for air;

air supply control means responsive to a higher pressure in said first chamber than said second chamber to permit air to enter said second chamber;

adjustment means operable to modify the action of said control means in accordance with variation of environmental pressure;

a first restrictor in said first outlet;

a second restrictor in said second outlet, said second restrictor having a bore larger than that of said first restrictor;

a junction between said first and second outlets downstream of said restrictors, said junction leading said outlets into a common supply duct;

a first demand regulator connected in said common supply duct and permitting on demand flow of gas therethrough;

an emergency demand regulator bypassing said first demand regulator;

a demand regulator by-pass cock operable to divert gas flow in said common supply duct from said first to said emergency demand regulator;

environmental pressure modulation control means operable in response to variation in environmental pressure to modify the operation of said first and emergency demand regulators;

pressure breathing control means operable in response to emergency change in environmental pressure to override the operation of said first and emergency demand regulators;

an emergency oxygen supply facility connected into said common supply duct downstream of said junction and upstream of said by-pass cock and arranged for connection to an emergency oxygen source for supply at a pressure lower than that of said first oxygen supply but above normal atmospheric pressure;

said air supply control means comprising a diaphragm dividing said first chamber from said second chamber and a valve operable by said diaphragm to open said air inlet;

each said demand regulator comprising a chamber with an inlet and an outlet, a diaphragm forming part of the wall of said chamber and dividing said chamber from environmental pressure, and a valve operable by said diaphragm to allow gas to enter said chamber via said inlet;

said outlet of each said demand regulator being connected to means for delivering gas to a recipient; and said environmental pressure modulation control means and said pressure breathing control means being operable upon the diaphragm of each said demand regulator.

36. Apparatus as claimed in claim 35 and wherein said emergency demand regulator is arranged to require a slightly larger pressure difference for operation than said first demand regulator.

37. Apparatus as claimed in claim 33 and wherein said adjustment means, said environmental pressure modulation means, and said pressure breathing control means comprise aneroid capsules.

38. Apparatus as claimed in claim 33 and wherein said valves operable by said diaphragms are toggle valves.

* * * * *